US011770405B2

(12) United States Patent
Bjarnason et al.

(10) Patent No.: US 11,770,405 B2
(45) Date of Patent: Sep. 26, 2023

(54) AUTOMATED SELECTION OF DDOS COUNTERMEASURES USING STATISTICAL ANALYSIS

(71) Applicant: Arbor Networks, Inc., Westford, MA (US)

(72) Inventors: Steinthor Bjarnason, Fjerdingby (NO); Brian St. Pierre, Acworth, NH (US)

(73) Assignee: ARBOR NETWORKS, INC., Westford, MA (US)

(*) Notice: Subject to any disclaimer, the term of this patent is extended or adjusted under 35 U.S.C. 154(b) by 298 days.

(21) Appl. No.: 17/017,379

(22) Filed: Sep. 10, 2020

(65) Prior Publication Data

US 2022/0078205 A1    Mar. 10, 2022

(51) Int. Cl.
*H04L 9/40* (2022.01)
*H04L 41/142* (2022.01)
*G06F 18/22* (2023.01)
*G06F 18/211* (2023.01)

(52) U.S. Cl.
CPC ........ *H04L 63/1458* (2013.01); *G06F 18/211* (2023.01); *G06F 18/22* (2023.01); *H04L 41/142* (2013.01); *H04L 63/1416* (2013.01); *H04L 63/1425* (2013.01)

(58) Field of Classification Search
CPC .. G06K 9/6215; G06K 9/6228; H04L 41/142; H04L 63/0263; H04L 63/1416; H04L 63/1425; H04L 63/1458; G06F 18/211; G06F 18/22

See application file for complete search history.

(56) References Cited

U.S. PATENT DOCUMENTS

| | | | |
|---|---|---|---|
| 9,686,173 B1 * | 6/2017 | Giordano | H04L 41/142 |
| 10,469,528 B2 | 11/2019 | Bjarnason | |
| 11,216,563 B1 * | 1/2022 | Veselov | H04L 63/1408 |
| 2007/0150957 A1 * | 6/2007 | Hartrell | H04L 63/1425 726/24 |
| 2014/0089264 A1 * | 3/2014 | Talagala | G06F 11/1448 707/649 |
| 2014/0096251 A1 * | 4/2014 | Doctor | H04L 63/1441 726/23 |

(Continued)

*Primary Examiner* — Daniel B Potratz
*Assistant Examiner* — Matthias Habtegeorgis
(74) *Attorney, Agent, or Firm* — Foley & Lardner LLP (57) ABSTRACT

A method of automated filtering includes receiving a network traffic snapshot having packets with data stored in respective fields, generating a statistical data structure storing each potential unique combination of data stored in respective fields with an associated counter that is incremented for each occurrence that the combination matches one of the packets of the network traffic snapshot and one or more observation timestamps. Determining an observed vector from the statistical data structure, wherein the observed vector has associated attribute/value pairs and counters that satisfy a predetermined criterion. The observed vector's attribute/value pairs are compared to known attribute/value pairs associated with known DDoS attack vectors of an attack vector database. In response to finding a matching known attack vector as a result of the comparison, mitigation parameters associated with the known attack vector are selected and used for applying a countermeasure to the network traffic for mitigating an attack.

20 Claims, 6 Drawing Sheets

(56) References Cited

U.S. PATENT DOCUMENTS

| | | | |
|---|---|---|---|
| 2017/0093910 A1* | 3/2017 | Gukal | H04L 63/1416 |
| 2018/0234310 A1* | 8/2018 | Ingalls | H04L 41/22 |
| 2020/0076717 A1* | 3/2020 | Rantzau | H04L 49/50 |
| 2020/0137102 A1* | 4/2020 | Sheridan | H04L 63/105 |
| 2020/0137112 A1* | 4/2020 | Compton | H04L 63/1491 |
| 2020/0195534 A1* | 6/2020 | Monetti | H04L 43/065 |
| 2023/0025946 A1* | 1/2023 | Li | H04L 69/22 |

\* cited by examiner

AUTOMATED SELECTION OF DDOS COUNTERMEASURES USING STATISTICAL ANALYSIS

FIELD OF THE DISCLOSURE

Embodiments of the present disclosure relate generally to methods and systems for malware detection and mitigation, and specifically to automated selection of Distributed Denial of Service (DDoS) countermeasures using statistical analysis.

BACKGROUND OF THE DISCLOSURE

Attacks, such as attacks utilizing flooding, denial of service, DDoS, viruses, worms, Trojan horses, rogue applications, malware, exploits, spam, phishing, etc., are becoming an ever-increasing problem in today's Internet. For example, by sending large amounts of malicious packets, denial of service attacks can cause consumption and/or overload of scarce, limited, and/or non-renewable system and/or network resources, such as bandwidth, disk space, CPU time, and/or allocations thereof; destruction and/or alteration of configuration information, such as routing information; disruption of normal operating system functionality; and/or physical destruction and/or alteration of network components, etc.

There are different types of DDoS attacks, such as TCP SYN, DNS flooding, UDP flooding. Different countermeasures are effective for counteracting each of these respective types of DDoS attacks.

Once a DDoS attack is recognized, the determination of which countermeasures to apply is a manual process.

Conventional methods and systems for mitigating DDoS attacks have generally been considered satisfactory for their intended purpose. However, such methods and systems rely on considerable operator experience and skill, including skilled understanding of different types of attacks, and thus there is still a need in the art for automatic selection of appropriate DDoS countermeasures using statistical analysis.

SUMMARY OF THE DISCLOSURE

The purpose and advantages of the illustrated embodiments will be set forth in and apparent from the description that follows. Additional advantages of the illustrated embodiments will be realized and attained by the devices, systems and methods particularly pointed out in the written description and claims hereof, as well as from the appended drawings.

In accordance with a purpose of the illustrated embodiments, in one aspect, a a computerized method of automatic selection of countermeasures to an automatically detected Distributed Denial of Service (DDoS) attack. The method includes receiving a network traffic snapshot of network traffic, wherein packets of the network traffic snapshot each have data stored in respective fields of a set of one or more fields. The method further includes generating a statistical data structure that includes, for each unique packet of the network traffic snapshot, each potential unique combination of data stored in the respective fields of the set of one or more fields, each of the combinations having an associated counter that is incremented for each occurrence that the combination matches one of the packets of the network traffic snapshot and one or more timestamps indicating when the combination was observed. The method further includes determining an observed vector from the statistical data structure, wherein the observed vector has associated attribute/value pairs that characterize the respective one or more fields of one or more combinations, and wherein the one or more combinations have associated counters that satisfy a predetermined criterion. The attribute/value pairs associated with the observed vector are compared to known attribute/value pairs associated with known DDoS attack vectors of an attack vector database. In response to finding a known attack vector having matching known attribute/value pairs as a result of the comparison, mitigation parameters associated with the known attack vector are selected. The selected mitigation parameters are used for applying a countermeasure to the network traffic for mitigating an attack.

In one or more embodiments, mitigation parameters can be selected only if a percentage of the combinations of the statistical data structure that have data stored in the combination's associated data fields that matches the attribute/value pairs of the known attack vector exceeds a threshold.

In one or more embodiments, if the percentage of the combinations of the statistical data structure that have data stored in the combination's associated data fields that matches the attribute/value pairs of the known attack vector does not exceed the threshold, the method can further include continuing to compare the attribute/value pairs associated with a next observed vector to the known attribute/value pairs until a known attack vector having matching known attribute/value pairs is found as a result of the comparison.

In one or more embodiments, the method can further include determining from the attack vector database detailed attack parameters stored in association with the known attack vector, wherein the mitigation parameters selected can be based on the detailed attack parameters.

In one or more embodiments, the detailed attack parameters can be associated with detailed known attribute/value pairs, and wherein determining the detailed attack parameters can further include determining at least one observed sub-vector from the statistical data structure, wherein each of the at least one observed sub-vector can include detailed attribute/value pairs about the one or more combinations, the detailed attribute/value pairs having information of greater detail than the attribute/value pairs associated with the observed vector. The method can further include comparing in a second comparison the detailed attribute/value pairs of one of the at least one observed sub-vectors to the known detailed attribute/value pairs, wherein the mitigation parameters associated with the detailed attack parameters can be only selected if it is determined the detailed attribute/value pairs match the detailed known attribute/value pairs as a result of the second comparison.

In one or more embodiments, if the result of the second comparison indicates that the detailed attribute/value pairs of the observed sub-vector do not match the detailed known attribute/value pairs, the method can further include repeating the second comparison with the detailed attribute/value pairs of a next one of the at least one observed sub-vectors until a match is found.

In one or more embodiments, the method can further include applying the selected mitigation parameters as the countermeasure.

In one or more embodiments, the method can further include receiving a snapshot of peacetime network traffic known to be free of an applied attack, applying the selected mitigation parameters as the countermeasure to the peacetime snapshot, and based on packets of the peacetime snapshot that are blocked by the applied selected mitigation parameters, adjusting the selected mitigation parameters to reduce blocking packets of the peacetime snapshot. In other aspects of the disclosure, a network attack monitor and a non-transitory computer readable storage medium are each provided for detecting patterns for automated filtering of data. The network monitor includes a memory configured to store instructions and a processor in communication with the memory. The instructions, which when executed by the processor, cause the processor to perform the method of the disclosure. The non-transitory computer readable storage medium stores a program, which when executed by the computer system causes the computer system to perform the method of the disclosure.

BRIEF DESCRIPTION OF THE DRAWINGS

The accompanying appendices and/or drawings illustrate various, non-limiting, examples, inventive aspects in accordance with the present disclosure.

DETAILED DESCRIPTION OF CERTAIN EMBODIMENTS

The present disclosure is now described more fully with reference to the accompanying drawings, in which illustrated embodiments of the present disclosure are shown wherein like reference numerals identify like elements. The present disclosure is not limited in any way to the illustrated embodiments as the illustrated embodiments described below are merely exemplary of the disclosure, which can be embodied in various forms, as appreciated by one skilled in the art. Therefore, it is to be understood that any structural and functional details disclosed herein are not to be interpreted as limiting, but merely as a basis for the claims and as a representative for teaching one skilled in the art to variously employ the present disclosure. Furthermore, the terms and phrases used herein are not intended to be limiting but rather to provide an understandable description of the disclosure.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, exemplary methods and materials are now described. It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth.

It is to be appreciated the embodiments of this disclosure as discussed below can be configured as a software algorithm, program or code residing on computer useable medium having control logic for enabling execution on a machine having a computer processor. The machine typically includes memory storage configured to provide output from execution of the computer algorithm or program.

As used herein, the term "software" is meant to be synonymous with any code or program that can be in a processor of a host computer, regardless of whether the implementation is in hardware, firmware or as a software computer product available on a disc, a memory storage device, or for download from a remote machine. The embodiments described herein include such software to implement the equations, relationships and algorithms described below. One skilled in the art will appreciate further features and advantages of the disclosure based on the below-described embodiments. Accordingly, the disclosure is not to be limited by what has been particularly shown and described, except as indicated by the appended claims.

In exemplary embodiments, a computer system component may constitute a "module" that is configured and operates to perform certain operations as described herein below. Accordingly, the term "module" should be understood to encompass a tangible entity, be that an entity that is physically constructed, permanently configured (e.g., hardwired) or temporarily configured (e.g. programmed) to operate in a certain manner and to perform certain operations described herein.

It is to be further understood the illustrated embodiments of the present disclosure describe a system, apparatus, and method for automated mitigation techniques to recognize a DDoS attack by applying a statistical analysis to a snapshot of network traffic, determining observed vectors from results of the statistical analysis; comparing the observed vectors to known attack vectors for DDoS attacks stored in an attack vector database, selecting mitigation parameters associated with a matching known attack vector, wherein the selected mitigation parameters are applied as a countermeasure to the network traffic for mitigating an attack.

In one or more embodiments, the mitigation parameters are applied as countermeasures only if a percentage of the observed vectors that match the known attack vector exceeds a threshold percentage.

In one or more embodiments, before selecting the mitigation parameters, detailed information is selected from the network traffic snapshot and/or the statistical data structure and compared in a second comparison to detailed attack parameters associated with a sub-attack vector associated with the matching known attack vector. If the comparison results in finding a match, the selected mitigation parameters are selected from mitigation parameters associated specifically with the sub-attack vector. However, if the comparison does not result in finding a match, the selected mitigation parameters are generic for the matching known attack vector.

Figure 1:
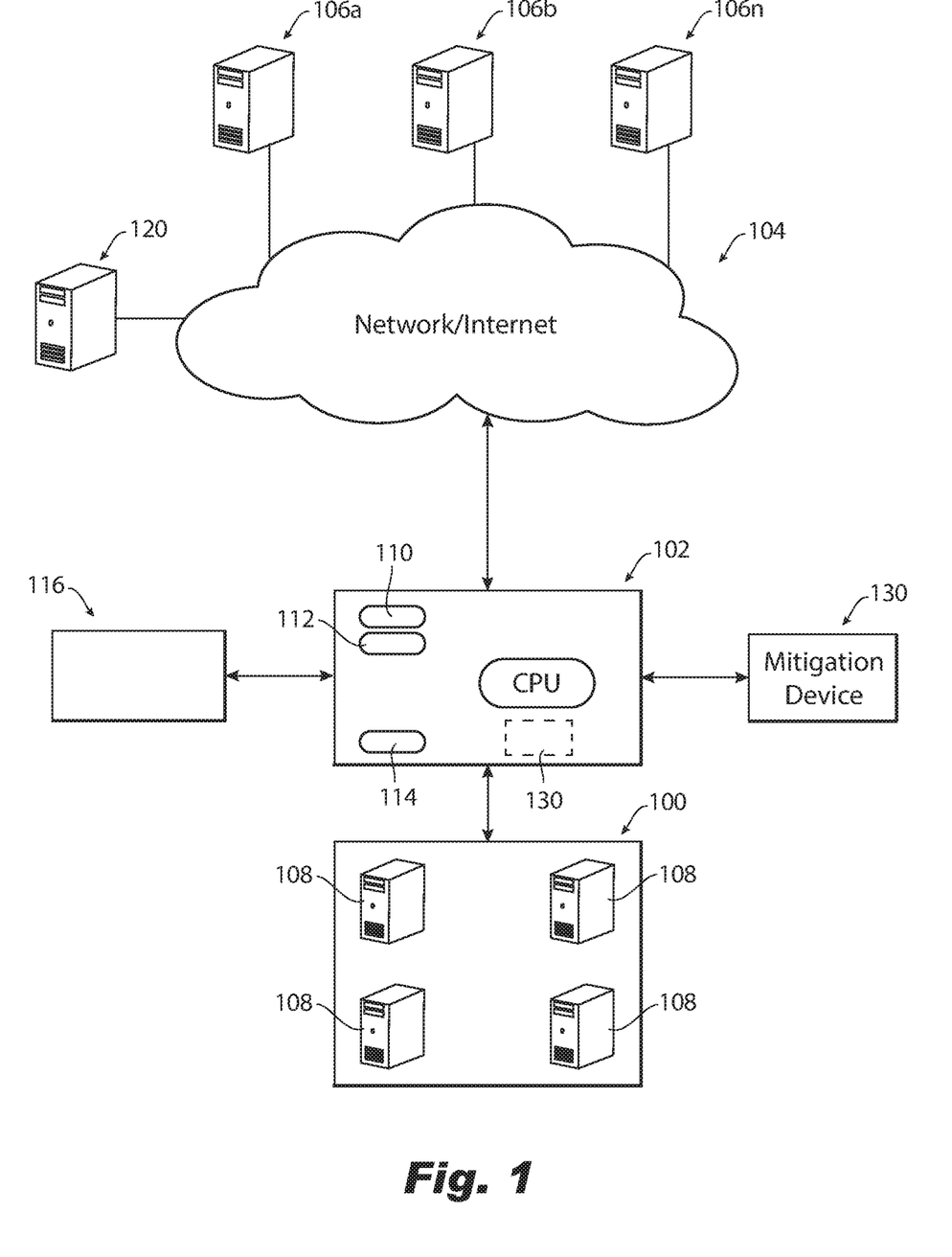
FIG. 1 is a schematic diagram showing network system and the relationship between an attack monitor and a protected network according to one embodiment of the present disclosure.

Turning now descriptively to the drawings, in which similar reference characters denote similar elements throughout the several views, FIG. 1 illustrates the relationship between a protected network 100, attack monitor 102, Internet 104, and external host devices 106a, 106b . . . 106n.

In a typical implementation, the external host devices 106 *a*, 106 *b* . . . 106*n* (also referred to as external devices or host devices) attempt to connect to protected devices 108 within the protected network 100, typically via a private network or a public computer network such as the Internet 104. Examples of external host devices include servers, laptops, desktop computers, tablet devices, mobile phones, mobile computing devices, video games systems, televisions, and other similar devices and systems having Internet connectivity. In one implementation, the attack monitor 102 is a device that authenticates all external host devices 106 *a*, 106 *b* . . . 106 *n* before allowing them to access the protected devices 108 within the protected network 100.

The attack monitor 102 can be configured, for example, similar to devices such as Arbor Edge Defense™ or Arbor Sightline™ by Arbor Networks, Inc. of Westford, Massachusetts. In embodiments, the protected network 100 protected by the attack monitor 102 can be located between the Internet 104 and the protected network 100. In embodiments, the protected network 100 can be an enterprise network, such as a school network, business network, and government network, to list a few non-limiting examples. In other embodiments, the attack monitor 102 is located within the Internet, service provider network, or enterprise network, rather than at the network edge as illustrated. It is to be appreciated that when deployed within the protected network 100, traffic can be diverted to the attack monitor 102.

The attack monitor 102 can include a packet processing system having communication interfaces, such as an external high-speed network interface 110 and a protected high-speed network interface 112, for receiving processing packets. The attack monitor 102 further includes one or more processors 114 that can process the packets received at interfaces 110 and 112. Attack monitor includes and/or accesses storage medium 116. A portion of, or the entirety of storage medium 116, can be integrated with attack monitor 102.

The storage medium 116 can store, for example, a statistical data structure, a results table, observed vectors, observed sub-vectors, one or more known attack vector databases, selected mitigation parameters and a matching known attack vector and/or known attack sub-vector.

The attack monitor 102 can automatically detect and identify an attack from attacking host 120 and provide mitigation parameters for mitigating the detected attack to a mitigation device 130 and/or generate alerts. As indicated by the dotted box, a portion of, or the entirety of mitigation device 130 can be integrated with attack monitor 102. Mitigation device can filter packets associated with an attack and apply countermeasures to the filtered packets to counteract the detected attack. The countermeasures can cause, for example, application of a filter, such as to block, redirect, or drop packets. A countermeasure may also immediately pass a packet, blacklist or whitelist a source address, terminate an established connection, or trigger an alert to an administrator. Other mitigation actions could be rate limiting, which will limit the number of packets allowed per source per second. In case of encrypted packets, a redirection to decryption device might be done when traffic is suspicious.

In order to reduce or minimize over-mitigation, attack monitor 102 can test the mitigation parameters against a snapshot of network traffic captured when it was known that no attacks were applied to the network traffic, also referred to as peacetime network traffic. Over-mitigation occurs when legitimate packets are filtered together with attack packets such that both legitimate packets and attack packets are blocked, redirected, or dropped, without distinguishing between legitimate and attack packets. Each packet in the peacetime network traffic can include data associated with respective fields of one or more fields, such as fields included in at least one of a header or payload of the associated packet.

With regards to automatic detection and identification of an attack by attack monitor 102, attack monitor receives a snapshot of network packets. The snapshot of network packets can be from a live stream of network traffic or accessed on demand, such as from recorded network traffic. Recorded traffic can be stored in a variety of formats, including packet capture (PCAP), NetMon, netttl, or RF5 file formats or other industry standard or vendor specific file formats. The packets each include a header and/or a payload with a plurality of fields. The header and/or payload include data associated with each of the fields. Examples of fields include source IP, source port, destination IP, destination port, and one or more payload data fields. Additionally, each packet has a packet length. Packets having a payload can have a payload length.

One skilled in the art will understand that the snapshot of network traffic can be obtained while an attack is underway. Even when an attack is underway, not all of the packets in the traffic snapshot are malicious and included in the attack itself. Much of the traffic snapshot can be legitimate packets that are being exchanged while the attack takes place. The attack can be simulated or can be an actual attack, such as by attacking host 120.

The received traffic snapshot is analyzed by a statistical analysis process. In a first pass of the statistical analysis process, a set of unique potential combinations of data stored in the respective fields of packets in the traffic snapshot is generated. The unique potential combinations include all possible value combinations of values in the plurality of fields, beginning with individual fields and continuing up to the maximum number of fields, using a statistical function $C(n, r)$. The combinations can be formed using fields in the header and/or payload of the packet.

Unique combinations for each of the packets in the traffic snapshot can be stored as entries in the statistical data structure, which can be stored, for example, in storage medium 116. Each combination entry in the statistical data structure has an associated counter as well as a timestamps indicating when the combination was observed, such as at when the combination was first and/or last observed. In one or more embodiments, the combinations can be generated during a first pass of the received traffic snapshot.

In one or more embodiments, the received traffic snapshot is further analyzed by a second pass of the statistical analysis process in which the packets of the traffic snapshot are compared to the combinations and the counter associated with each combination's entry is incremented for each occurrence that the combination matches data in fields of one of the packets of the traffic snapshot. The counter can indicate the degree to which data patterns recur in the traffic snapshot. Those data patterns included in the combinations that have a higher associated counter recur more frequently than data patterns associated with combinations that have lower counters.

As stated above, the combinations have data patterns that include different numbers of fields. When a combination matches a packet of the traffic snapshot (also referred to as a packet), the more fields included in the combination, the better the quality of the match.

The second analysis process can be performed in a second pass of the received traffic snapshot or during the first pass, meaning the same pass as the first analysis process. The first and second passes refer to processing the individual packets of the received traffic snapshot (e.g., serially or in parallel), until all of the received packets have been processed. One skilled in the art will understand that the first and second passes can be combined into a single pass that involves counting. The combinations can be analyzed for determining observed vectors, wherein the observed vectors include attribute/value pairs that characterize the fields of one or more combinations having associated counters that satisfy a predetermined criterion; The combinations (or a product of the potential combinations) can be sorted, such as based on their counter values. In this way, combinations most frequently observed in the traffic snapshot are giving a higher ranking by the sorting process than less frequently observed combinations. In this way, higher ranked combinations can be accessed more rapidly than lower ranked combinations for determining observed vectors. An example of a sorting process and generation of the statistical data structure is described by U.S. Pat. No. 10,469,528, assigned to Arbor Networks, Inc. of Westford, MA, and incorporated herein by reference in its entirety. The disclosure is not limited to a particular function or order for sorting based on counters. Results of the sorting can be stored in the results table, which is stored in storage medium 116.

A first group of one or more combinations can be accessed by a function that is called to access higher ranked combinations that satisfy first selected criteria. The first group includes the attributes and corresponding values, counters and time stamp values that were stored with each of the combinations in the first group. The first criteria can be rankings that are above a first threshold. The function can be called in subsequent iterations to obtain subsequent groups of one or more combinations, wherein each time the function is called it uses revised criteria with iteratively lower thresholds. In this way, combination that were most frequently observed in the traffic snapshot are accessed and grouped first (because the combinations are sorted based on counter values).

An observed vector can be determined for each group. The observed vector is determined based on the attributes and corresponding values of the combinations in each group.

In this way, after all of the combinations have been generated and processed to determine the associated counter and timestamp(s) associated with each unique combination entry, and then ranked based on their associated counters, the combinations for the respective combination entries in the statistical data structure can be used to represent one or more observed vectors. One or more of the observed combinations can be used to match an observed vector. The observed vectors include attribute/value pairs that represent information stored in one or more associated unique combination entries.

To illustrate, an example of an observed vector that matches a known attack vector associated with a TCP SYN attack (and its variants) would be characterized by:
1) The packet per second (pps) rate of a single combination "tcp:flags" containing flags SYN (S), SYN-ACK (SA), RESET (R) or ACK (A) is greater than 10 pps, and
2) an average packet size, which is calculated from a combination "tcp:flags" and "ipv4:len," is less than 80 bytes.
3) On the other hand, if a combination of "ipv4: source_addr", "tcp:flags" with flags SA or R forms more than 5% of the total traffic, the observed vector would rather be determined to match a known "Reflected TCP SYN" attack vector.

In another example, an observed vector determined to match a known attack vector associated with a DNS attack (and its variants) would be characterized by:
1) The pps rate of a combination "udp:dest_port" with value 53 (DNS) is higher than 50, which matches a known DNS flooding attack vector.
2) If a combination "udp:dest_port", "dns:query", "dns:query_type" with dns:query_type equal to "A", "NS", "CNAME", "PTR" or "AAAA" has pps rates>50, the observed vector would be determined to match a known "DNS query flood" attack vector; otherwise if the pps rates>=50, the observed vector would be determined to match a known "generic DNS flooding" attack vector.
3) However, if the pps rate of a combination "udp:source_port" with value 53 is higher than 50, the observed vector would be determined to match a known "DNS Reflection" attack vector.

Additionally, in order to more effectively identify the type of attack and select appropriate mitigation parameters, when an observed vector matches a known attack vector, one or more observed sub-vectors of the observed vectors are determined that include more detailed attribute/value pairs than the observed vector.

For example, an observed vector may be determined to match a known attack vector for a UDP flooding attack when the combination "ipv4:protocol" with value 17 (UDP is protocol #17) is the majority of the traffic and the pps value is a magnitude higher than expected. However, this information would only suffice to determine that a UDP flooding attack is taking place, but would be insufficient to start a specific DDoS mitigation.

With further analysis of additional attribute/value pairs of an observed sub-vector and a determination that "udp:source_port" with high pps rates detected for value 123, a determination can be made that the observed sub-vector matches as a known "NTP Reflection" attack sub-vector.

The mitigation device 130 can be integrated or external from the attack monitor 102, e.g., as a router that applies the BGP flow specification rules or Openflow rules or as an internal filter.

In one or more embodiments, the first and second passes of the statistical analysis processes can be performed using different methods. In a first example method and without limitation to the specific example methods provided, a statistical analysis is used that applies a statistical combination function to packets of the traffic snapshot. In accordance with the statistical method, the first analysis process applies a statistical combination function to packets of the traffic snapshot to generate a collection of potential combinations. The potential combinations are associated with values included in different fields of the packets of the traffic snapshot.

The second pass of the statistical analysis process includes comparing the received packets of the traffic snapshot to the potential combinations, which includes comparing character strings of the fields of packets of the received traffic snapshot to character strings of corresponding fields of the potential combinations. The statistical method is described in greater detail in U.S. Pat. No. 10,469,528, the entirety of which is incorporated herein by reference.

Advantageously, the attack monitor 102 can perform the analysis either on network snapshot data that includes live, streamed network traffic or stored network traffic. In either case, once an observed vector or observed sub-vector is determined to match a known attack vector or known attack sub-vector, mitigation parameters associated with the known attack vector or known attack sub-vector can be applied. The mitigation parameters can use the detected patterns to identify packets to which countermeasures should be applied. This enables the attack monitor 102 to provide sophisticated attack protection services, such as applying countermeasures in particular to packets that match the detected patterns, including in an automated fashion without the need for operator intervention.

More specifically, once the observed vectors are determined from the statistical data structure and/or the network traffic snapshot, attack monitor 102 compares the observed vectors to known attack vectors of an attack vector database stored in storage medium 116. A matching known attack vector is selected as a result of the comparison. Mitigation parameters associated with and generic to the matching known attack vector can be selected, wherein the selected mitigation parameters can be used for application of countermeasures to the network traffic by mitigation device 130 for mitigating an attack.

In one or more embodiments, before applying the countermeasures to the network traffic, a process is performed to provide further targeted countermeasures by determining detailed mitigation parameters to apply that are associated with a selected more detailed known sub-vectors of the known attack vector that includes more detailed attribute/value pairs than the known attack vector.

The observed attribute/value pairs of the observed sub-vector are compared in a second comparison to the known attribute/value pairs stored in association with one or more known sub-vectors associated with the matching known attack vector. If it is determined based on the second comparison that the sub-vector matches one of the known sub-vectors associated with the matching known attack vector, then detailed mitigation parameters associated with the matching known sub-vector are selected to be the mitigation parameters. Detailed mitigation parameters of known sub-vectors associated with the known attack vector that do not match the detailed information are not used for selecting the mitigation parameters to be applied. The selected mitigation parameters are used for applying countermeasures by the mitigation device 130. A method for avoiding over-mitigation can be applied before, during, or after application of the mitigation parameters to avoid (meaning to reduce or eliminate) over-mitigation.

The statistical method can include a method for avoiding over-mitigation by mitigation device 130 can be applied. A method for reducing over-mitigation is described in greater detail in U.S. patent Ser. No. 16/800,874, the entirety of which is incorporated herein by reference.

The method for avoiding over-mitigation can include a third pass in which the selected mitigation parameters are compared to a stored snapshot of peacetime network traffic that is known to be free from attacks. Before the mitigation parameters are applied by the mitigation device 130, they are applied to each of the packets in the peacetime traffic snapshot. If more than a threshold number of packets would be dropped by the mitigation parameters, then the mitigation parameters are not automatically applied to the mitigation device 130. In this case, an administrator can optionally be alerted, where the alert contains the attempted mitigation parameters and the quantity of peacetime traffic that would be dropped by these parameters. Additionally, the second pass described above can be repeated to search for other observed sub-vectors in order to find different mitigation parameters that will not be rejected by the over-mitigation test. The snapshot of peacetime network traffic can be, for example and without limitation, recorded traffic (e.g., formatted as PCAP, NetMon, netttl, RF5, or the equivalent) that was received from known good hosts, such as hosts that have been authenticated using a username and password with a service on the protected network 108.

During the third pass, the respective combinations stored in the statistical data structure are compared to the peacetime network traffic and a good match counter associated with the respective combination entries is incremented for each occurrence that the combination being compared matches one of the packets of the peacetime network traffic. The method is described in greater detail in U.S. application Ser. No. 16/800,874, the entirety of which is incorporated herein by reference.

An attack can use multiple attack vectors. Accordingly, once mitigation parameters have been selected based on known attack vectors (and optionally its associated known attack sub-vectors) the process can be repeated to find additional known attack vectors and/or known attack sub-vectors that match another observed vector in the statistical data structure. The selected mitigation parameters can be updated based on a known attack vector (and optionally its associated known attack vectors) that match the other observed vector. This process can continue until no further matching known attack vectors or matching known attack sub-vectors are found.

The traffic snapshot can be updated with live network traffic and the first and second passes can be repeated for finding new observed vectors. When new observed vectors are found, the process can be repeated to find matching known attack vectors and/or known sub-vectors and to update the selected mitigation parameters based on the results of finding matches.

Furthermore, the third pass can be repeated any time the selected mitigation parameters are updated and/or anytime the stored snapshot of peacetime network traffic is updated.

FIGS. 2-5 show exemplary and non-limiting flow diagrams illustrating methods for mitigating network attacks in accordance with certain illustrated embodiments. The methods can be performed by an attack monitor, such as attack monitor 102. Before turning to description of FIGS. 2-5, it is noted that the flow diagrams in FIGS. 2-5 show example methods in which operations are carried out in a particular order, as indicated by the lines connecting the blocks, but the various steps shown in this diagram can be performed in a different order, or in a different combination or sub-combination. It should be appreciated that in some embodiments, some of the steps described below may be combined into a single step. In some embodiments, one or more additional steps may be included. In some embodiments, one or more of the steps can be omitted.

The example methods shown in FIGS. 2-5 can be performed by an attack monitor, such as attack monitor 102 shown in FIG. 1. With reference to example flow diagram 200, of FIG. 2, at block 210, a statistical analysis is applied to a received snapshot of network traffic. Results of the analysis include unique combinations for each of the packets in the traffic snapshot that are stored as entries in a statistical data structure 201, which can be stored in storage medium 116. The combinations in the statistical data structure can be sorted. Results of the sorting can be applied to the statistical data structure or stored in a separate results table.

Figure 2:
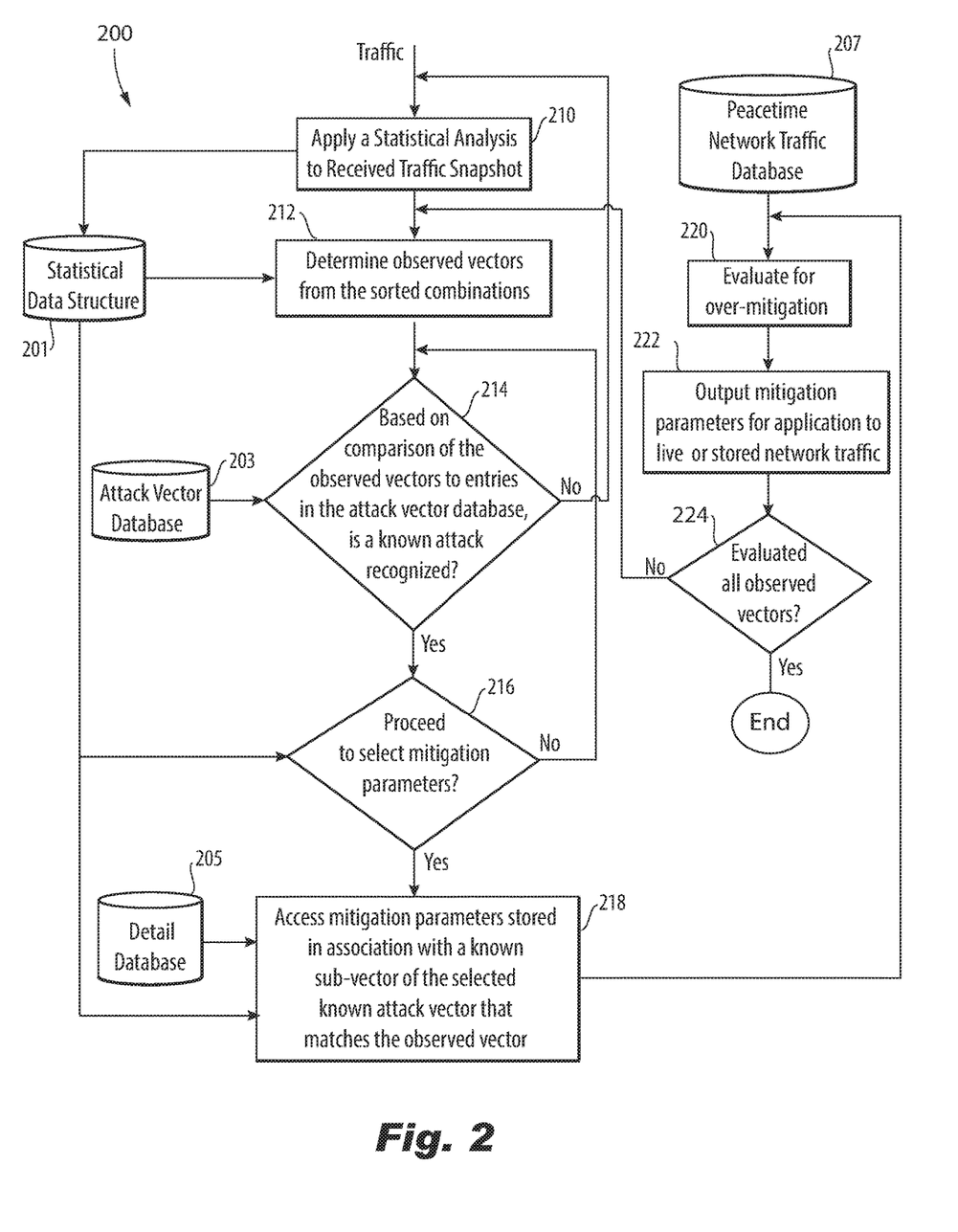
FIG. 2 is a flow diagram illustrating an example method for automated detection of an attack and selection of mitigation parameters to be applied in accordance with the illustrated embodiments.

At block 212, observed vectors are determined from the sorted combinations. At block 214, a determination is made whether a known attack is recognized by consulting an attack vector database 203 of known attacks and applying a rules-based process to compare the observed vectors to entries in the attack vector database 203 for finding a match. When a match is found, this is an indication that the observed vectors are associated with one or more known types of attack. Block 214 and the attack vectors database 203 is described in greater detail with respect to FIG. 3.

At block 216, a decision is made whether to proceed to select mitigation parameters or to continue to compare the observed vectors with the known attack vectors stored in attack vector database 203. This decision includes a determination made at 216 whether a percentage of the observed vectors that match the known attack vector that was found at block 214 exceeds a predetermined threshold. If the determination at block 216 is that the threshold is exceeded, the method continues at block 218. Otherwise, if the determination at block 216 is that the threshold is not exceeded, the method returns to block 214. Block 216 can be optional, such that in one or more embodiments, block 216 is not included or is included as part of block 214.

At block 218, an attack vector detail database 205 (also referred to as detail database) is consulted, wherein detail database 205 includes one or more known sub-vectors associated with respective known attack vectors stored in attack vector database 203. Each known sub-vector has an associated detailed mitigation parameters. In consulting the detail database 205 at block 218, a determination is made whether the observed vector matched to the attack vector at block 214 has any observed sub-vectors that match any of the attack sub-vectors associated with the matched attack vector. The determination of a match at block 218 can include application of a set of rules. When a match is found, this is an indication that the observed vector being processed is associated with a subtype of the known attack vector's type determined at block 214. At block 218, the detailed mitigation parameters stored in association with the matching known sub-vector are accessed. Block 218 and the details database 205 are described in greater detail with respect to FIG. 4.

At block 220, a method for evaluating for over-mitigation is applied for either validating or rejecting the mitigation parameters. This method is described in greater detail in FIG. 5. At block 222, the mitigation parameters are output for application to live or stored network traffic. After block 222, the method continues at operation 224 for determining observed vectors.

At block 224, a determination is made whether all observed vectors have been evaluated. If not, the method continues at operation 212 in which a next observed vector is processed.

The entire method, beginning at block 210, can be automatically repeated by updating the traffic snapshot with new network traffic that may be subjected to new attacks and repeating blocks 210-224. In this way, new attacks can be detected and automatically mitigated. This provides a fully automated DDoS mitigation system that can be automatically updated over time.

Figure 3:
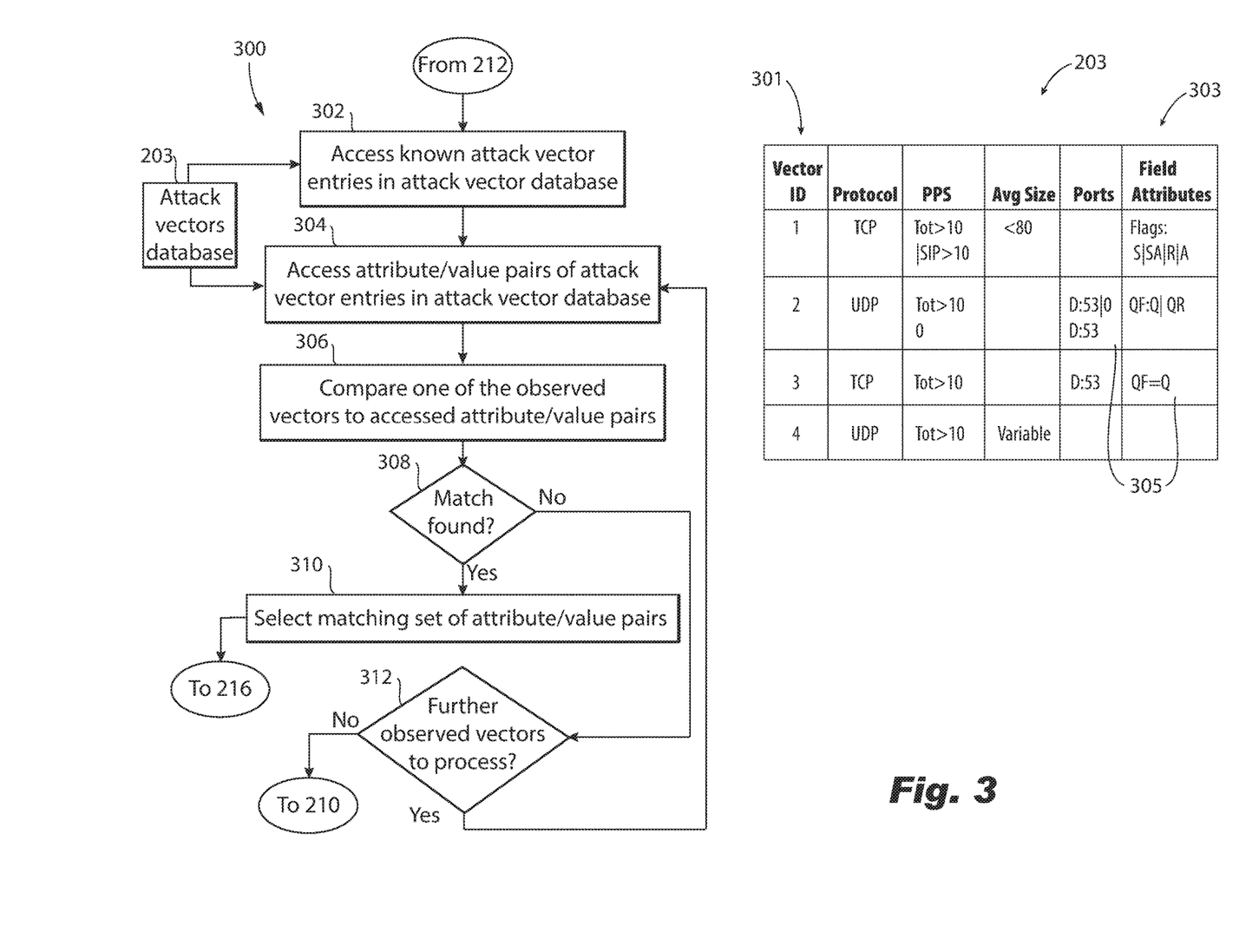
FIG. 3 is a flow diagram illustrating an example method for identification of a detected attack.

With reference to FIG. 3, flow diagram 300 shows an example method performed at block 212 in greater detail and known attack vectors database 203 is shown in greater detail. Attack vectors database 203 includes an entry for each known attack vector. The known attack vectors represent characteristics of attacks that are known. Known attacks are attacks that have been previously identified, have known characteristics, and for which mitigation parameters have been determined as being particularly targeted for the known attack. Each entry includes an identifier 301 for the known attack vector, and one or more known attribute/value pairs. Some examples attributes 303 are shown, including protocol, packets per second (PPS), average size (e.g., in bytes), source or destination port(s), and field attributes. Some example values 305 are shown for respective attributes of each of the known attack vectors, wherein each value entered for a known attack vector's attribute represents an attribute/value pair. A characteristic of a known attack can be a group of attribute/value pairs associated with the known attack vector that corresponds to the attack. Also, in one or more embodiments, a set of mitigation parameters can be associated with each known attack vector is.

Some examples of additional mitigation parameters include checking that packets are well formed according to the protocol they contain, limiting resource usage by a particular source address, such as by limiting a rate of queries, a number of connections, lifetime of connections, or rate of transfer over a connection, limiting by geographic origin, and banning packets from sources that send packets that induce errors in the protected servers.

Some examples of mitigation actions (countermeasures) include applying an access control list to block specific traffic specified by source IP and/or source port, and/or other fields; activating a specific DDoS countermeasure module that is designed to deal with a specific attack, such as a countermeasure configured to authenticate TCP SYN traffic or a DNS countermeasure configured to deal with DNS query floods; identifying specific patterns in the network traffic, which can use, for example regular expressions.

Other countermeasures can include rate limiting, applying a whitelist of IP address or other parameters, and/or redirection of traffic for further analysis.

With reference to flow diagram 300, at block 302, known attack vector entries in attack vector database 203 are accessed. At block 304, the attribute/value pairs of the known attack vector entries in the attack vector database 203 are accessed. At block 306, one of the observed vectors is compared to the accessed attribute/value pairs. At block 308, a determination is made whether a match was found, meaning the set of attribute/value pairs of one of known attack vectors matches corresponding attribute/value pairs of the observed vector.

If the determination at block 308 was that a match was found (YES), then the matching known attack vector having the matching set of known attribute/value pairs is selected at block 310 and the method continues at block 216 in FIG. 2.

In one or more embodiments in which the mitigation parameters are available in association with the selected known attack vector, such as when details database 205 is not available, the associated mitigation parameters can be accessed and the method can continue at block 220 or block 222 of FIG. 2.

Although the flow diagrams do not show a case in which a match was not found, and the process is repeated using the same (or an updated) traffic snapshot to look for additional matches of other observed vectors and the known attack vectors, it is understood that the method could be continued for identifying additional known attack vectors and selecting appropriate mitigation parameters for the additional matching attack vectors.

If the determination at block 308 was that a match was not found (NO), the method continues at block 312. At block 312, a determination is made whether there are any further observed vectors to process.

If the determination at block 312 is that are more observed vectors to process (YES), the method continues at block 304 using a next observed vector.

If the determination at block 312 is that are no more observed vectors to process (NO), the method ends until there is an updated traffic snapshot to analyze, at which point the method would be repeated, beginning at operation 210 using the updated traffic snapshot.

Figure 4:
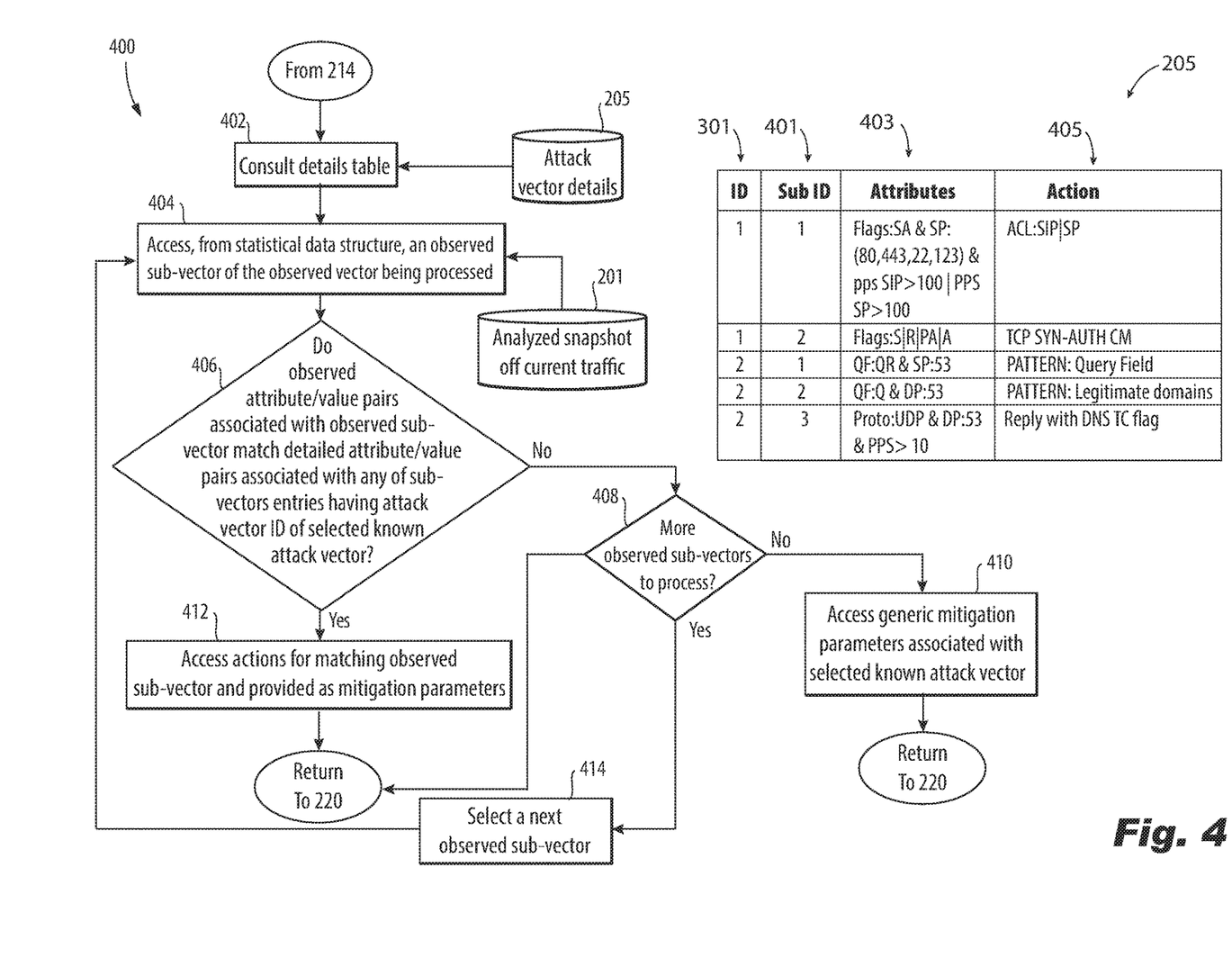
FIG. 4 is a flow diagram illustrating an example method for identification of a detailed attack parameters of an identified attack and selection of detailed mitigation parameters.

FIG. 4 shows an example method performed at block 218 of FIG. 2 in greater detail and details database 205 is shown in greater detail.

Details database 205 includes one or more known sub-vector entries for the known attack vectors represented in attack vector database 203. The known sub-vector entries represent known sub-vectors associated with a known attack vector and describe detailed characteristics associated with sub-types of the known attack vector's type. Detailed mitigation parameters are associated with the known sub-vector entries that are particularly targeted for the corresponding attack sub-type. The objective is to determine which known sub-vector entry has associated detailed characteristics that best match the observed vector and its observed sub-vectors. The detailed characteristics are described as one or more detailed known attribute/value pairs that are fine-tuned to provide a higher level of detail than provided by the known attribute/value pairs provided in attack vector database 203.

As shown, each entry in details database 205 has an associated attack vector ID 301, sub-ID 401, detailed attribute/value pairs 403, and actions 405. The attack vector ID 301 identifies the known attack vector, and the sub-ID 401 identifies the known sub-vector that corresponds to the attack vector ID 301. An attack vector ID 301 can have one or more sub-IDs that represent sub-vector attacks, each having a different sub-type. The detailed attribute/value pairs 403 are unique for each sub-ID 402 of the attack vector ID 301 and represent a fine-tuned characteristic of the corresponding known attack vector. The actions 405 include detailed mitigation parameters that can be unique for each sub-ID 402 of the attack vector ID 301. The detailed mitigation parameters can be targeted for the known sub-vector, e.g., for its attack sub-type.

The method continues at block 402 following selection of a matching known attack vector at block 308. In one or more embodiments, the method continues from block 308 to block 216, after which the method conditionally continues at block 402, provided the determination at block 216 is positive. In one or more embodiments, the method continues from block 308 to block 402.

At block 402, details table 205 is consulted. Detailed attribute/value pairs 403 are accessed for each sub-vector entry having the attack vector ID 301 of the known attack vector selected at block 308 of FIG. 3 (referred to as the selected known attack vector). Each known sub-vector entry has the attack vector ID 301 of the selected known attack vector and a unique sub-vector ID 402. At block 404, an observed sub-vector of the observed vector being processed is accessed from the statistical data structure 201. At block 406, a rules-based determination is made whether observed attribute/value pairs associated with the observed sub-vector match the detailed attribute/value pairs 403 associated with any of the known sub-vectors entries having the attack vector ID 301 of the selected known attack vector.

If the determination at block 406 is that a match was found (YES), the method continues at block 412. At block 412, the actions 405 for the matching known sub-vector are accessed and provided as mitigation parameters to be applied by mitigation device 130 as countermeasures, and the method continues at block 220 shown in FIG. 2.

If the determination at block 406 is that a match was not found (NO), the method continues at block 408. At block 408 a determination is made whether there are more observed attack sub-vectors to process. If the determination at block 408 is that there are more observed attack sub-vectors to process (YES), the method continues at block 414 to select a next observed attack sub-vector, after which the method continues at block 404. If the determination at block 408 is that there are no further observed attack sub-vectors to process (NO), the method continues at block 410. At block 410, the generic mitigation parameters associated with the selected known attack vector are accessed.

Figure 5:
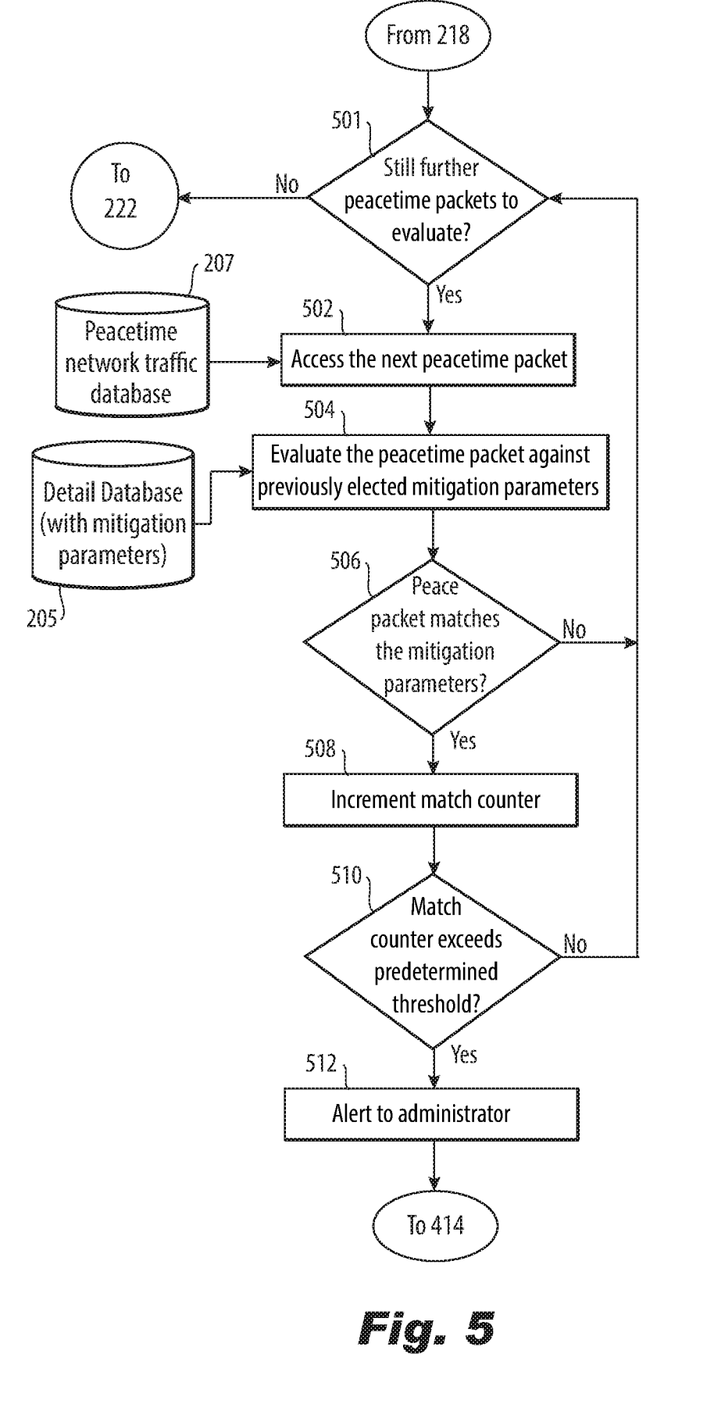
FIG. 5 is a flow diagram illustrating an example method for reducing or minimizing over-mitigation in accordance with the illustrated embodiments.

FIG. 5 shows block 220 of FIG. 2 in greater detail. At block 501, peacetime network traffic database 207 is accessed to determine if there are still further packets of the peacetime network traffic database 207 to evaluate. If the determination at block 501 is that NO, there no further packets of the peacetime network traffic database 207 to evaluate, meaning the evaluation is complete, the method continues at block 222 of FIG. 2. If the determination at block 501 is that YES, there are further packets of the peacetime network traffic database 207 to evaluate, the method continues at block 502. At block 502, the next packet in the peacetime network traffic database 207 is accessed. At block 504, the packet is evaluated against mitigation parameters from the detail database 205 that were selected at block 218 of FIG. 2.

At block 506, a determination is made based on the evaluation performed at block 504 whether the packet matches the mitigation parameters. If the determination at block 506 is that NO, the packet does not match the mitigation parameters, the method returns to block 501 to continue accessing any packets in the peacetime network traffic database 207 that have not been evaluated yet. If the determination at block 506 is YES, that the packet does match the mitigation parameters, the method continues at block 508. At block 508, a match counter is incremented.

At block 510, a determination is made whether the match counter exceeds a predetermined threshold. If the determination is NO, meaning the number of peacetime packets that have matched the mitigation parameters does not exceed the threshold and over-mitigation has not yet occurred, the method returns to block 501. If the determination is YES, meaning the number of peacetime packets that have matched the mitigation parameters has now exceeded the threshold, indicating that these mitigation parameters cause over-mitigation, the method continues at block 512 to optionally send an alert to an administrator, where the alert includes the attempted mitigation parameters and the quantity of peacetime traffic that would be dropped by these parameters. Then, the method continues at block 414 of FIG. 4 to search again for another observed sub-vector in order to find different mitigation parameters that will not be rejected by the over-mitigation test. With returned reference to FIG. 3, TABLE 1 below shows additional example entries to table 203 representing known attack vectors are illustrated below, with an additional column for attack type. When an observed vector of a traffic snapshot matches a known attack vector, it is an indication that an attack of attack type associated with the known attack vector is targeting the traffic snapshot. Also associated with each known attack vector are generic mitigation parameters (not shown), wherein the generic mitigation parameters are appropriate mitigation parameters for the attack type indicated.

TABLE 1

| Vector ID | Attribute/Value Pairs (expressed as (attribute, value)) | Attack Type |
|---|---|---|
| 5 | (protocol, TCP); (packet size, small (below threshold A)); (packet per second rate, (per source IP address > 10) or (high (above threshold B) irrespective of source IP address)); (flags used; common TCP flags) | TCP flooding attack |
| 6 | (protocol, UDP); (source port or destination port, 53); (packet per second rate, small (below threshold A)); (DNS query flags, "query" or "query response") | DNS flooding attack |
| 7 | (protocol, TCP); (destination port, 53); (packet per second rate, high (above threshold B)); (DNS query flags, "query") | DNS Authoritative server starvation attack |
| 8 | (protocol, UDP); (source port, unspecified); (packet per second rate, high (above B threshold )); (payload length, varying) | Generic UDP flooding attack |

With returned reference to FIG. 4, additional examples of known sub-vectors are now described. When an observed sub-vector of an observed vector of the traffic snapshot matches a known sub-vector, it is an indication that an attack of attack sub-type associated with the known sub-vector is targeting the traffic snapshot. Although not shown in table 205, each known sub-vector has associated detailed mitigation parameters that are most appropriate for application as a countermeasure to the network traffic for mitigating an indicated attack sub-type indicated for effective mitigation of the attack sub-type.

Known Sub-Vector Example 1

When an observed vector is determined to be a TCP flooding attacks, determination of a known sub-vector can assist selecting detailed mitigation parameters that are more efficient as countermeasures. Possible known sub-vectors include, for example, sub-vectors that represent TCP reflection, TCP SYN, TCP SYN-ACK, TCP RST, TCP PSH-ACK, or TCP ACK attacks.

A known sub-vector representing a TCP reflection attack has detailed attribute/value pairs that indicate TCP flags set to SYN-ACK, source ports originating from common services, such as ports 80 (HTTP), 443 (HTTPS), 22 (SSH), or 123 (SMB), and traffic volume per second per source IP and/or per source port being high (e.g., above threshold C). The detailed mitigation parameters associated with a TCP reflection known sub-vector would be used for countermeasures that create an access control list and block the identified source addresses and/or source ports.

Otherwise, if the observed sub-vector does not match the TCP Reflection known sub-vector, the detailed mitigation parameters would be used for countermeasures that enable a dedicated challenge/response countermeasure for sending challenge packets to source IP's identified in the detailed attribute/value pairs in order to validate if the source IP as a legitimate client or a spoofed source IP.

Known Sub-Vector Example 2

When an observed vector is determined to be a DNS flooding attack, possible known sub-vectors can represent a flooding attack or a reflected DNS query flood attack.

A known sub-vector representing a DNS flooding attack has detailed attribute/value pairs that indicate the source port equals 53 and the DNS query flag is "query response." The detailed mitigation parameters associated with a DNS flooding known sub-vector would be used for countermeasures that use a pattern matching filter and identify patterns in the DNS query field.

A known sub-vector representing a DNS query flood (designed to interrupt DNS servers) has detailed attribute/value pairs that indicate the destination port equals 53. If a customer site has no DNS servers, the detailed mitigation parameters provide an access control list that blocks all UDP traffic to port 53. If the customer site has authoritative DNS server(s), the detailed mitigation parameters provide a filter that matches only DNS queries for legitimate domains hosted on the authoritative DNS server(s) for filtering out DNS queries for any other domains. Furthermore, if a query rate for legitimate DNS servers and domains is higher than normally expected (for example more than 100 requests per second), the mitigation parameters should specify that a response to a client's DNS query include a DNS packet with the TC flag set, forcing legitimate the client to switch to TCP and resend the DNS query.

Known Sub-Vector Example 3

A known sub-vector representing a TCP based DNS Authoritative server starvation attack has detailed attribute/value pairs that indicate the DNS queries are only for domains that match legitimate domains hosted on authoritative DNS server(s) of the customer site and the packet per second rate per source IP exceeds a normally expected rate (for example 5 packets per second). Detailed mitigation parameters provide for placing clients that exceed the normally expected rate being placed on a short-lived access control list that temporarily blocks source addresses identified on the access control list for the life of the control list. When the access control list expires, the mitigation parameters provide for calculating the packet per second rate again for clients that were on the control list. If a client that was on the control list is still exceeding the normally expected rate, the detailed mitigation parameters provide for creation of a new short-lived access control list blocking the client with a longer lifespan.

Known Sub-Vector Example 4

A known sub-vector representing a UDP based flooding attack has detailed attribute/value pairs that do not indicate the source port is random, but indicate the destination port is fixed to the value 443 (QUIC). The detailed mitigation parameters provide for creation of an access control list that blocks UDP traffic to port 443, as this will force legitimate clients to reestablish a TCP based session.

If the attribute/value pairs indicate the destination port is also random, in one or more embodiment's, the detailed mitigation parameters can provide for blocking traffic based on traffic from certain geographic regions of the world and allowing only traffic from clients located at well-known geographic regions. In one example, countermeasure can be applied that create an access control list that blocks traffic originating from certain regions of the world. In another example, countermeasures can apply Time-to-live (TTL) values that indicate how many physical hops separate the source of the traffic from the destination, wherein the initial TTL value is reduced by one for each physical link/router which the network traffic traverses. For example, a service hosted in Los Angeles that services would provide customers on the west coast of the Unites States of America with a narrow range of acceptable TTL values, customers on the east coast with a low limit on acceptable TTL values, and clients connecting from Europe or Asia with considerably lower limit on acceptable TTL values than most US based customers. By setting a lower limit on acceptable TTL values, clients with low TTL values would be blocked from connecting to the service. Acceptable ranges of TTL values would be calculated based on analysis of a traffic sample containing peacetime traffic. In one or more embodiments, the detailed mitigation parameters would provide for only allowing UDP based traffic to access those services that are hosting services and block everything else.

Figure 6:
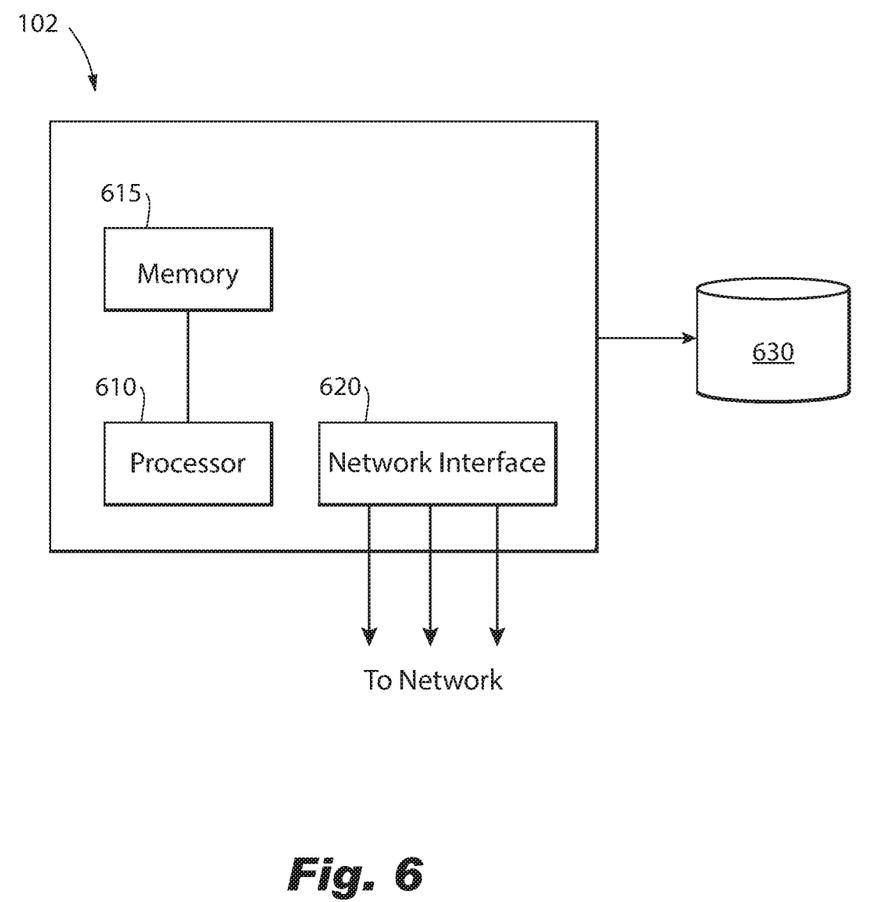
FIG. 6 is a block diagram of the attack monitor of FIG. 1, in accordance with an embodiment of the present disclosure.

With reference now to FIG. 6, illustrated is an exemplary and non-limiting block diagram of the attack monitor 102 constructed according to an illustrated embodiment. The attack monitor 102 is communicatively coupled to the protected network 100 and to a database 630 (which can include storage medium 116), and is at least configured to execute the method for automatically detecting and determining countermeasures against network attacks as described in greater detail above. The attack monitor 102 can include a processor 610 coupled to a memory 615 and a network-interface module 620. The network-interface module 620 allows the communication with the protected network 100. The processor 610 uses instructions stored in the memory 615 to execute attack detection tasks as well as to control and enable the operation of the network-interface module 620.

Mitigation device 130, whether external or internal to the attack monitor 102, includes a processor, memory and network interface, which can be fully or partially shared with the any of the respective processor, 610, memory 615, and network interface 620. The mitigation device 130, whether external or internal to attack monitor 102, can similarly be coupled to the protected network 100 and to the database 630.

The various embodiments disclosed herein can be implemented as any combination of hardware, firmware, and software. Moreover, the software can be implemented as an application program tangibly embodied on a program storage unit or computer readable medium. The application program may be uploaded to, and executed by, a machine comprising any suitable architecture. The machine can be implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

The flow diagram and block diagrams in the Figures illustrate the architecture, functionality, and operation of possible implementations of systems, methods and computer program products according to various embodiments of the present disclosure. In this regard, each block in the flow diagram or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flow diagram illustration, and combinations of blocks in the block diagrams and/or flow diagram illustration, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for automatic selection of countermeasures to an automatically detected Distributed Denial of Service (DDoS) attack, the method comprising:
   receiving a network traffic snapshot of network traffic, wherein packets of the network traffic snapshot each have data stored in respective fields of a set of one or more packet fields;
   generating, from the network traffic snapshot, a statistical data structure that includes a plurality of unique combinations of data stored in the respective fields of the set of one or more packet fields, each of the plurality of unique combinations having an associated counter that is incremented for each occurrence that the combination matches one of the packets of the network traffic snapshot and one or more timestamps indicating when the combination was observed;
   determining an observed vector from the statistical data structure, wherein the observed vector has associated attribute/value pairs that characterize the respective fields of one or more combinations of the plurality of unique combinations formed into a group, wherein the one or more combinations are grouped based on having associated counters that satisfy a predetermined criterion;
   comparing the attribute/value pairs associated with the observed vector to known attribute/value pairs associated with known DDoS attack vectors of an attack vector database; and
   in response to finding a known attack vector having matching known attribute/value pairs as a result of the comparison, selecting mitigation parameters associated with the known attack vector, wherein the selected mitigation parameters are used for applying a countermeasure to the network traffic for mitigating an attack.

2. The method of claim 1, wherein the mitigation parameters are selected only if a percentage of the plurality of unique combinations of the statistical data structure that have data stored in the associated data fields that match the attribute/value pairs of the known attack vector exceeds a threshold.

3. The method of claim 2, further comprising, if the percentage of the plurality of unique combinations does not exceed the threshold, continuing to compare the attribute/value pairs associated with a next observed vector to the known attribute/value pairs until a known attack vector having matching known attribute/value pairs is found as a result of the comparison.

4. The method of claim 1, wherein the method further comprises determining from the attack vector database detailed attack parameters stored in association with the known attack vector, wherein the mitigation parameters selected are based on the detailed attack parameters.

5. The method of claim 4, wherein the detailed attack parameters are associated with detailed known attribute/value pairs, and wherein determining the detailed attack parameters further comprises:
  determining at least one observed sub-vector from the statistical data structure, wherein each of the at least one observed sub-vector includes detailed attribute/value pairs about the one or more combinations, the detailed attribute/value pairs having information of greater detail than the attribute/value pairs associated with the observed vector;
  comparing in a second comparison the detailed attribute/value pairs of an observed sub-vector of the at least one observed sub-vectors to the known detailed attribute/value pairs, wherein the mitigation parameters associated with the detailed attack parameters are only selected if it is determined the detailed attribute/value pairs match the detailed known attribute/value pairs as a result of the second comparison.

6. The method of claim 4, further comprising, if the result of the second comparison indicates that the detailed attribute/value pairs of the observed sub-vector do not match the detailed known attribute/value pairs, repeating the second comparison with the detailed attribute/value pairs of a next one of the at least one observed sub-vectors until a match is found.

7. The method of claim 1, further comprising applying the selected mitigation parameters as the countermeasure.

8. The method of claim 1, further comprising:
  receiving a snapshot of peacetime network traffic known to be free of an applied attack;
  applying the selected mitigation parameters as the countermeasure to the snapshot of peacetime network traffic; and
  based on packets of the snapshot of peacetime traffic that are blocked by the applied selected mitigation parameters, adjusting the selected mitigation parameters to reduce blocking packets of the snapshot of peacetime traffic.

9. A network attack monitor for automatic selection of countermeasures to an automatically detected Distributed Denial of Service (DDoS) attack, the network attack monitor comprising:
  a memory configured to store instructions;
  a processor and in communication with the memory, wherein the processor upon execution of the instructions is caused to:
    receive a network traffic snapshot of network traffic, wherein packets of the network traffic snapshot each have data stored in respective fields of a set of one or more packet fields;
    generate, from the network traffic snapshot, a statistical data structure that includes a plurality of unique combinations of data stored in the respective fields of the set of one or more packet fields, each of the plurality of unique combinations having an associated counter that is incremented for each occurrence that the combination matches one of the packets of the network traffic snapshot and one or more timestamps indicating when the combination was observed;
    determine an observed vector from the statistical data structure, wherein the observed vector has associated attribute/value pairs that characterize the respective fields of one or more combinations of the plurality of unique combinations formed into a group, wherein the one or more combinations are grouped based on having associated counters that satisfy a predetermined criterion;
    compare the attribute/value pairs associated with the observed vector to known attribute/value pairs associated with known DDoS attack vectors of an attack vector database; and
    in response to finding a known attack vector having matching known attribute/value pairs as a result of the comparison, select mitigation parameters associated with the known attack vector, wherein the selected mitigation parameters are used for applying a countermeasure to the network traffic for mitigating an attack.

10. The network attack monitor of claim 9, wherein the mitigation parameters are selected only if a percentage of the plurality of unique combinations of the statistical data structure that have data stored in associated data fields of the plurality of unique combinations that match the attribute/value pairs of the known attack vector exceeds a threshold.

11. The network attack monitor of claim 10, wherein the processor upon execution of the instructions is further caused to, if the percentage of the plurality of unique combinations does not exceed the threshold, continue to compare the attribute/value pairs associated with a next observed vector to the known attribute/value pairs until a known attack vector having matching known attribute/value pairs is found as a result of the comparison.

12. The network attack monitor of claim 9, wherein the processor upon execution of the instructions is further caused to determine from the attack vector database detailed attack parameters stored in association with the known attack vector, wherein the mitigation parameters selected are based on the detailed attack parameters.

13. The network attack monitor of claim 12, wherein the detailed attack parameters are associated with detailed known attribute/value pairs, and wherein determining the detailed attack parameters further comprises:
  determining at least one observed sub-vector from the statistical data structure, wherein each of the at least one observed sub-vector includes detailed attribute/value pairs about the one or more combinations, the detailed attribute/value pairs having information of greater detail than the attribute/value pairs associated with the observed vector; and
  comparing in a second comparison the detailed attribute/value pairs of one of the at least one observed sub-vectors to the known detailed attribute/value pairs,
  wherein the mitigation parameters associated with the detailed attack parameters are only selected if it is determined the detailed attribute/value pairs match the detailed known attribute/value pairs as a result of the second comparison.

14. The network attack monitor of claim 12, wherein if the result of the second comparison indicates that the detailed attribute/value pairs of the one of the at least one observed sub-vectors do not match the detailed known attribute/value pairs, the processor upon execution of the instructions is further caused to repeat the second comparison with the detailed attribute/value pairs of a next one of the at least one observed sub-vectors until a match is found.

15. The network attack monitor of claim 9, wherein the processor upon execution of the instructions is further caused to apply the selected mitigation parameters as the countermeasure.

16. The network attack monitor of claim 9, wherein the processor upon execution of the instructions is further caused to:
   receive a snapshot of peacetime network traffic known to be free of an applied attack;
   apply the selected mitigation parameters as the countermeasure to the snapshot of peacetime network traffic; and
   based on packets of the good snapshot that are blocked by the applied selected mitigation parameters, adjust the selected mitigation parameters to reduce blocking packets of the snapshot of peacetime network traffic.

17. A non-transitory computer readable storage medium storing one or more computer programs embedded therein, the computer programs comprising instructions, which when executed by a computer system, cause the computer system to:
   receive a network traffic snapshot of network traffic, wherein packets of the network traffic snapshot each have data stored in respective fields of a set of one or more packet fields;
   generate, from the network traffic snapshot, a statistical data structure that includes a plurality of unique combinations of data stored in the respective fields of the set of one or more packet fields, each of the plurality of unique combinations having an associated counter that is incremented for each occurrence that the combination matches one of the packets of the network traffic snapshot and one or more timestamps indicating when the combination was observed;
   determine an observed vector from the statistical data structure, wherein the observed vector has associated attribute/value pairs that characterize the respective fields of one or more combinations of the plurality of unique combinations formed into a group, wherein the one or more combinations are grouped based on having associated counters that satisfy a predetermined criterion;
   compare the attribute/value pairs associated with the observed vector to known attribute/value pairs associated with known Distributed Denial of Service (DDoS) attack vectors of an attack vector database; and
   in response to finding a known attack vector having matching known attribute/value pairs as a result of the comparison, select mitigation parameters associated with the known attack vector, wherein the selected mitigation parameters are used for applying a countermeasure to the network traffic for mitigating an attack.

18. The non-transitory computer readable storage medium of claim 17, wherein the mitigation parameters are selected only if a percentage of the plurality of unique combinations of the statistical data structure that have data stored in associated data fields of the plurality of unique combinations that match the attribute/value pairs of the known attack vector exceeds a threshold.

19. The non-transitory computer readable storage medium of claim 17, wherein the computer system upon execution of the instructions is further caused to determine from the attack vector database detailed attack parameters stored in association with the known attack vector, wherein the mitigation parameters selected are based on the detailed attack parameters.

20. The non-transitory computer readable storage medium of claim 19, wherein the detailed attack parameters are associated with detailed known attribute/value pairs, and wherein determining the detailed attack parameters further comprises:
   determining at least one observed sub-vector from the statistical data structure, wherein each of the at least one observed sub-vector includes detailed attribute/value pairs about the one or more combinations, the detailed attribute/value pairs having information of greater detail than the attribute/value pairs associated with the observed vector; and
   comparing in a second comparison the detailed attribute/value pairs of one of the at least one observed sub-vectors to the known detailed attribute/value pairs,
   wherein the mitigation parameters associated with the detailed attack parameters are only selected if it is determined the detailed attribute/value pairs match the detailed known attribute/value pairs as a result of the second comparison.

\* \* \* \* \*